(12) United States Patent
Luo et al.

(10) Patent No.: US 11,024,467 B2
(45) Date of Patent: *Jun. 1, 2021

(54) SELF-CHARGING SUPERCAPACITOR

(71) Applicants: Tsinghua University, Beijing (CN); HON HAI PRECISION INDUSTRY CO., LTD., New Taipei (TW)

(72) Inventors: Zhi-Ling Luo, Beijing (CN); Chang-Hong Liu, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/738,186

(22) Filed: Jan. 9, 2020

(65) Prior Publication Data

US 2020/0234891 A1   Jul. 23, 2020

(30) Foreign Application Priority Data

Jan. 23, 2019 (CN) .......................... 201910065369.3

(51) Int. Cl.
    *H01G 11/24* (2013.01)
    *H01G 11/36* (2013.01)
    *H02J 7/34* (2006.01)
    *H01G 11/54* (2013.01)
    *H01G 11/28* (2013.01)

(52) U.S. Cl.
    CPC .............. *H01G 11/24* (2013.01); *H01G 11/28* (2013.01); *H01G 11/36* (2013.01); *H01G 11/54* (2013.01); *H02J 7/345* (2013.01)

(58) Field of Classification Search
    None
    See application file for complete search history.

(56) References Cited

U.S. PATENT DOCUMENTS

| | | | |
|---|---|---|---|
| 9,780,291 B2* | 10/2017 | Wang | H01M 10/425 |
| 2003/0035982 A1* | 2/2003 | Ryu | H01M 14/00 |
| | | | 429/7 |
| 2007/0248889 A1 | 10/2007 | Schmidt et al. | |
| 2010/0328845 A1 | 12/2010 | Hiralal et al. | |
| 2011/0198558 A1* | 8/2011 | Okai | H01L 29/7781 |
| | | | 257/9 |
| 2012/0171574 A1* | 7/2012 | Zhamu | H01M 4/364 |
| | | | 429/300 |
| 2016/0285137 A1* | 9/2016 | Gayden | H01G 11/28 |
| 2016/0293954 A1* | 10/2016 | Zhamu | H01G 11/62 |

(Continued)

FOREIGN PATENT DOCUMENTS

| | | |
|---|---|---|
| CN | 101023546 A | 8/2007 |
| CN | 102449715 A | 5/2012 |
| CN | 206640374 U | 11/2017 |

*Primary Examiner* — Dion Ferguson
(74) *Attorney, Agent, or Firm* — ScienBiziP, P.C.

(57) ABSTRACT

A self-charging supercapacitor is provided which includes a supercapacitor first electrode, a supercapacitor second electrode, a first electrolyte, and a metal electrode. The supercapacitor first electrode and the supercapacitor second electrode are parallel to and spaced apart from each other. A part of the metal electrode is Ohmic contacted with a surface of the supercapacitor second electrode, and another part of the metal electrode is disposed opposite to the supercapacitor first electrode.

16 Claims, 10 Drawing Sheets

(56) References Cited

U.S. PATENT DOCUMENTS

| | | |
|---|---|---|
| 2019/0295781 A1* | 9/2019 | Yde-Andersen ....... H01G 11/08 |
| 2020/0234890 A1* | 7/2020 | Luo ........................ H01G 11/36 |
| 2020/0234892 A1* | 7/2020 | Luo ........................ H01G 11/08 |
| 2020/0365336 A1* | 11/2020 | Luo ........................ H01G 11/52 |
| 2020/0388444 A1* | 12/2020 | Luo ........................ H01G 11/36 |

* cited by examiner

S1: providing a self-charging supercapacitor 10a which includes a supercapacitor first electrode 110, a supercapacitor second electrode 120, first electrolyte 130, and a metal electrode 210a; the supercapacitor first electrode 110 and the supercapacitor second electrode 120 are parallel and spaced with each other, the supercapacitor first electrode 110, the supercapacitor second electrode 120, and the first electrolyte 130 together form a supercapacitor, the metal electrode 210a and the supercapacitor second electrode 120 form an Ohmic contact, the metal electrode 210a is spaced and opposite to the supercapacitor first electrode 110

S2: conducting the metal electrode 210a and the supercapacitor first electrode 110 with a second electrolyte 230

SELF-CHARGING SUPERCAPACITOR

CROSS-REFERENCE TO RELATED APPLICATIONS

The application is related to co-pending applications entitled, "SELF-CHARGING SUPERCAPACITOR", U.S. Pat. No. 16/738,138; "METHOD FOR CHARGING SELF-CHARGING SUPERCAPACITOR", U.S. Pat. No. 16/738, 166.

FIELD

The present disclosure relates to the field of energy storage, and more particularly to supercapacitor.

BACKGROUND

Supercapacitors are promising energy storage devices with a capacitance value much higher than other capacitors, but with lower voltage limits. However, supercapacitors can only store but not harvest energy.

What is needed, therefore, is a supercapacitor which can both harvest and store energy.

BRIEF DESCRIPTION OF THE DRAWINGS

Many aspects of the embodiments can be better understood with reference to the following drawings. The components in the drawings are not necessarily drawn to scale, the emphasis instead being, placed upon clearly illustrating the principles of the embodiments. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to be better illustrate details and features. The description is not to be considered as limiting the scope of the embodiments described herein.

Several definitions that apply throughout this disclosure will now be presented.

The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to essentially conforming to the particular dimension, shape or other word that substantially modifies, such that the component need not he exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 1:
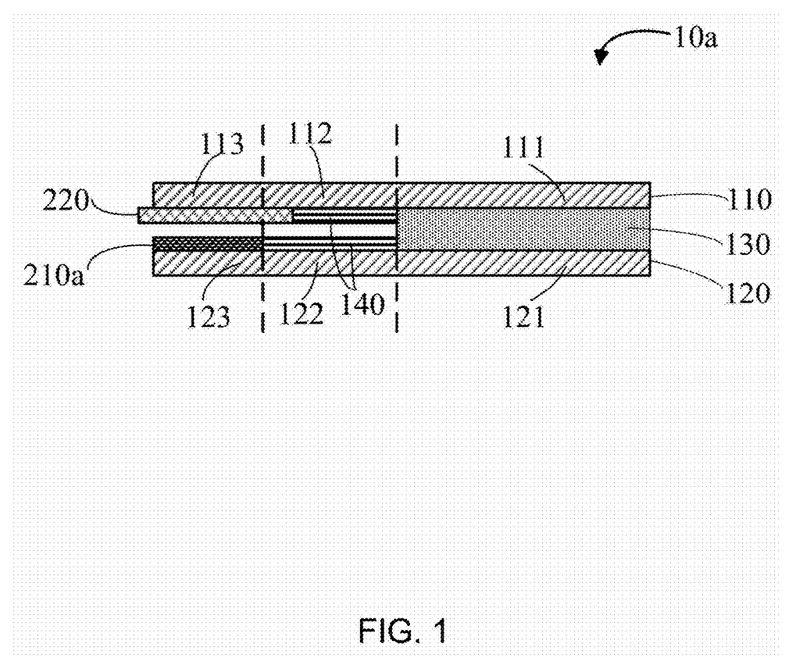
FIG. 1 is a structural schematic view of one embodiment of a self-charging supercapacitor.

FIG. 1 shows an embodiment of a self-charging supercapacitor 10a. The self-charging supercapacitor 10a includes a supercapacitor first electrode 110, a supercapacitor second electrode 120, first electrolyte 130, and a metal electrode 210a The supercapacitor first electrode 110 and the supercapacitor second electrode 120 are substantially parallel to and spaced apart from each other. The supercapacitor first electrode 110, the supercapacitor second electrode 120, and the first electrolyte 130 together form a supercapacitor. The metal electrode 210a and the supercapacitor second electrode 120 form an Ohmic contact. The metal electrode 210a is spaced apart from and opposite to the supercapacitor first electrode 110. The metal electrode 210a is configured as a negative electrode of a metal-air cell, and the supercapacitor first electrode 110 is configured as a positive electrode of the same metal-air cell.

The supercapacitor first electrode 110 and the supercapacitor second electrode 120 can be made of any material suitable for supercapacitor electrode. In one embodiment, the supercapacitor first electrode 110 and the supercapacitor second electrode 120 each includes a carbon nanotube/polyaniline (CNT/PANI) composite film.

The CNT/PANI composite film includes a carbon nanotube network structure and a polyaniline layer. The carbon nanotube network structure includes a plurality of carbon nanotubes combined by van der Waals attractive force therebetween and forming a free-standing film network. The term "free-standing" includes, but is not limited to, a structure that does not have to be supported by a substrate and can sustain its own weight when it is hoisted by a portion of the structure without any significant damage to its structural integrity. The free-standing property is achieved only due to the van der Waals attractive force between adjacent carbon nanotubes. The carbon nanotube network structure includes a plurality of micropores defined by adjacent carbon nanotubes. A size of the plurality of micropores can be in a range from about 60 nm to about 400 nm.

Figure 2:
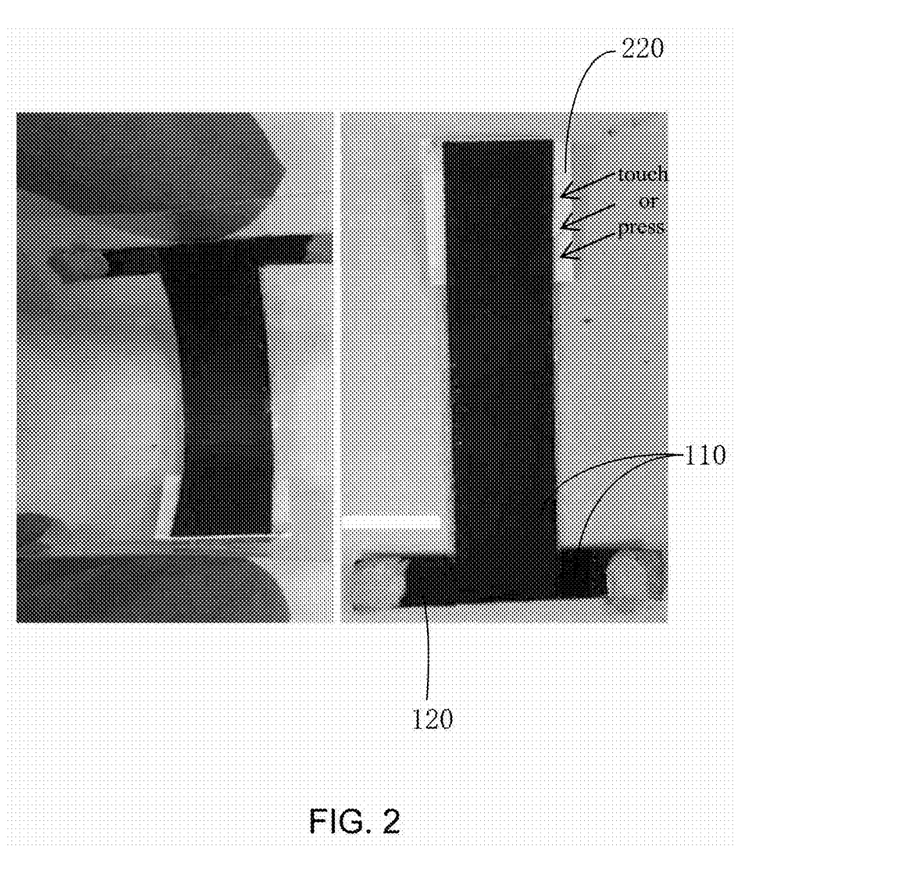
FIG. 2 is a photo of a self-charging supercapacitor being in normal state and bending state, respectively.

The polyaniline layer is coated on a surface of the carbon nanotube network structure. The polyaniline layer wraps around the plurality of carbon nanotubes. The carbon nanotube network structure serves as the core and the template to support the polyaniline layer. The CNT/PANI composite film is thin, light-weight, and flexible because of the plurality of carbon nanotubes and microspores. FIG. 2 shows the CNT/PANI composite film being in normal state and bending, state, respectively.

The size and shape of the supercapacitor first electrode 110 and the supercapacitor second electrode 120 can be substantially the same. The length of the supercapacitor first electrode 110 and the supercapacitor second electrode 120 can range from about 20 mm to about 90 mm, the width of the supercapacitor first electrode 110 and the supercapacitor second electrode 120 can range from about 5 mm to about 20 mm, and the thickness of the supercapacitor first electrode 110 and the supercapacitor second electrode 120 can range from about 50 µm to about 200 µm.

In one embodiment, the supercapacitor first electrode 110 and the supercapacitor second electrode 120 are rectangular sheets with a length of about 45 millimeter, a width of about 10 millimeter, and a thickness of about 100 micrometer.

The supercapacitor first electrode 110 includes a first surface and a second surface opposite to the first surface, and the first surface is spaced apart from and opposite to the supercapacitor second electrode 120. Similarly, the supercapacitor second electrode 120 includes a first surface and a second surface opposite to the first surface, and the second surface is spaced apart from and opposite to the supercapacitor first electrode 110.

The supercapacitor first electrode 110 can be further divided into a first portion 111, a second portion 112, and a third portion 113, wherein the first portion 111 and the third portion 113 are spaced by the second portion 112. Similarly, the supercapacitor second electrode 120 can be further divided into a fourth portion 121, a fifth portion 122, and a sixth portion 123, wherein the fourth portion 121 and the sixth portion 123 are spaced by the fifth portion 122.

The size and shape of the first portion 111 and the fourth portion 121 can be substantially the same. The first portion 111 is spaced apart from and opposite to the fourth portion 121 to thrill a first gap. The first electrolyte 130 is filled into the first gap. The first electrolyte 130 can be supercapacitor electrolyte, such as polyvinyl alcohol/$H_2SO_4$ ($PVA/H_2SO_4$) gel electrolyte. The first portion 111, the fourth portion 121, and the first electrolyte 130 together form a supercapacitor 100.

The size and shape of the third portion 113 and the sixth portion 123 can he substantially the same. The third portion 113 is spaced apart from and opposite to the sixth portion 123. The metal electrode 210a is located on a surface of the sixth portion 123. And the metal electrode 210a is spaced apart from and opposite to the third portion 113. The material of the metal electrode 210a can be magnesium, aluminum, zinc, iron, or the like. The length and width of the metal electrode 210a can be the same as the sixth portion 123. The thickness of the metal electrode 210a can be in a range from about 25 µm to about 100 µm. In one embodiment, the metal electrode 210a is an aluminum foil with a thickness of 50 µm.

Figure 3:
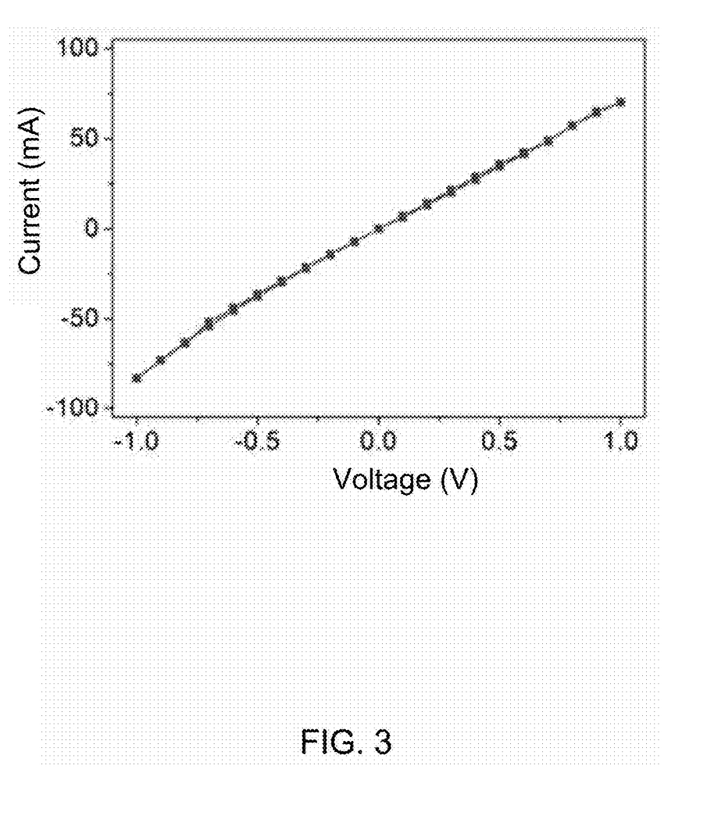
FIG. 3 is a current-voltage curve of an Ohmic contact junction formed by a metal electrode and a carbon nanotube/polyaniline composite film.

The metal electrode 210a and the sixth portion 123 are Ohmic contacted at the junction. A conductive adhesive can be located between the metal electrode 210a and the sixth portion 123. In one embodiment, the conductive adhesive is silver paste. FIG. 3 shows the current-voltage curve of the silver paste assisted junction.

The metal electrode 210a is spaced apart from and opposite to the supercapacitor first electrode 110. On one embodiment, a separator 220 is sandwiched between the metal electrode 210a and the supercapacitor first electrode 110 in order to prevent the metal electrode 210a from contacting the supercapacitor first electrode 110. The separator 220 can be any separators for battery system. In one embodiment, the separator 220 is a filter paper pasted on the surface of the third portion 113.

In one embodiment, at least one insulating layer 140 is located between the second portion 112 and the fifth portion 122 to prevent direct contact of the supercapacitor first electrode 110 and the supercapacitor second electrode 120. The insulating layer 140 can be directly connected with the second portion 112 and the fifth portion 122 or not. The insulating layer 140 can be located on the surface of the second portion 112 opposite to the fifth portion 122. The insulating layer 140 also can be located on the surface of the fifth portion 122 opposite to the second portion 112. In one embodiment, both surfaces of the second portion 112 opposite to the fifth portion 122 and the surface of the fifth portion 122 opposite to the second portion 112 are coated with the insulating layer 140. The insulating layer 140 can prevent direct contact of the supercapacitor first electrode 110 and the supercapacitor second electrode 120.

In one embodiment, the shapes of the first portion 111, the second portion 112, and the third portion 113 are rectangular with equal width. Specifically, the first portion 111 is 23 mm in length and 10 mm in width, the second portion 112 is 10 mm in length and 10 mm in width, and the third portion 113 is 12 mm in length and 10 mm in width. Similarly, the shapes of the fourth portion 121, the fifth portion 122, and the sixth portion 123 are rectangular with equal width. Specifically, the fourth portion 121 is 23 mm in length and 10 mm in Width, the fifth portion 122 is 10 mm in length and 10 mm in width, and the sixth portion 123 is 12 mm in length and 10 mm in width.

Figure 4:
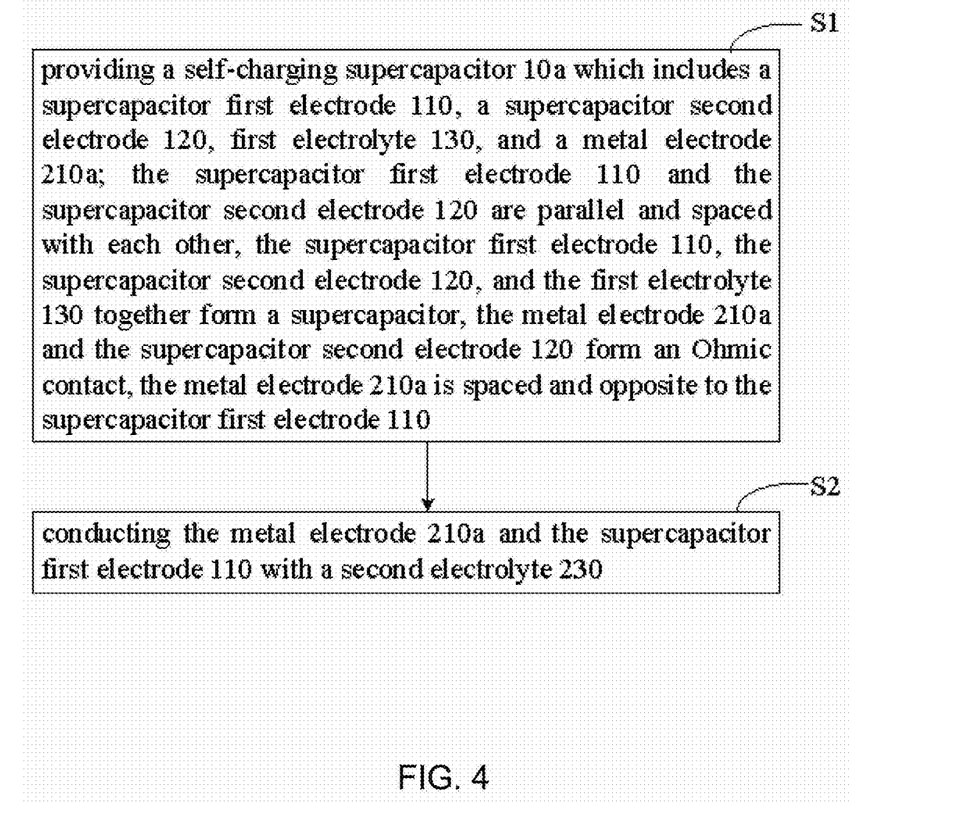
FIG. 4 is a flow chart of one embodiment of a method for charging self-charging supercapacitor.

Referring to FIG. 4, a method for charging the self-charging supercapacitor is provided according to one embodiment. The method includes, at least the following blocks:

S1, providing the self-charging supercapacitor 10a which includes a supercapacitor first electrode 110, a supercapacitor second electrode 120, a first electrolyte 130, and a metal electrode 210a; the supercapacitor first electrode 110 and the supercapacitor second electrode 120 are parallel to and spaced apart from each other, the Supercapacitors first electrode 110, the supercapacitor second electrode 120, and the first electrolyte 130 together form a supercapacitor, the metal electrode 210a and the supercapacitor second electrode 120 form an Ohmic contact, the metal electrode 210a is spaced apart from and opposite to the supercapacitor first electrode 110; and S2, electrically connecting the metal electrode 210a and the supercapacitor first electrode 110 with a second electrolyte 230.

Figure 5:
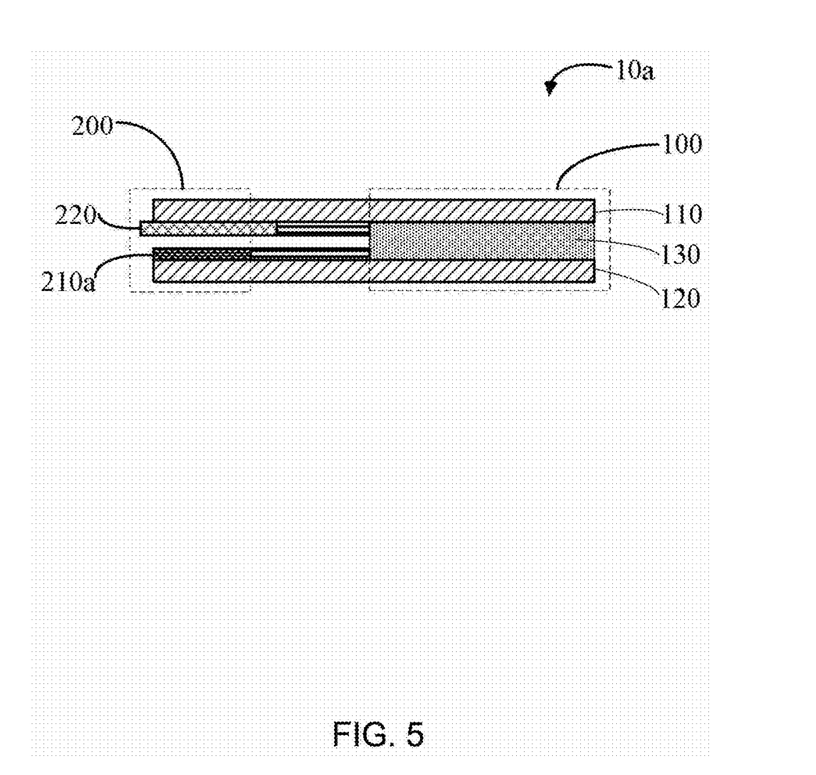
FIG. 5 is another schematic view of the self-charging supercapacitor in FIG. 1.

Referring to FIG. 5, the self-charging supercapacitor 10a can be divided into two units according to different functions, namely a supercapacitor block 100 and a metal-air cell block 200. The supercapacitor unit 100 includes part of the supercapacitor first electrode 110, part of the supercapacitor second electrode 120, and the first electrolyte 130. The metal-air cell unit 200 includes part of the supercapacitor first electrode 110, the metal electrode 210a, and separator 220, wherein the supercapacitor first electrode 110 also serves as a positive electrode of a metal-air cell.

Figure 6:
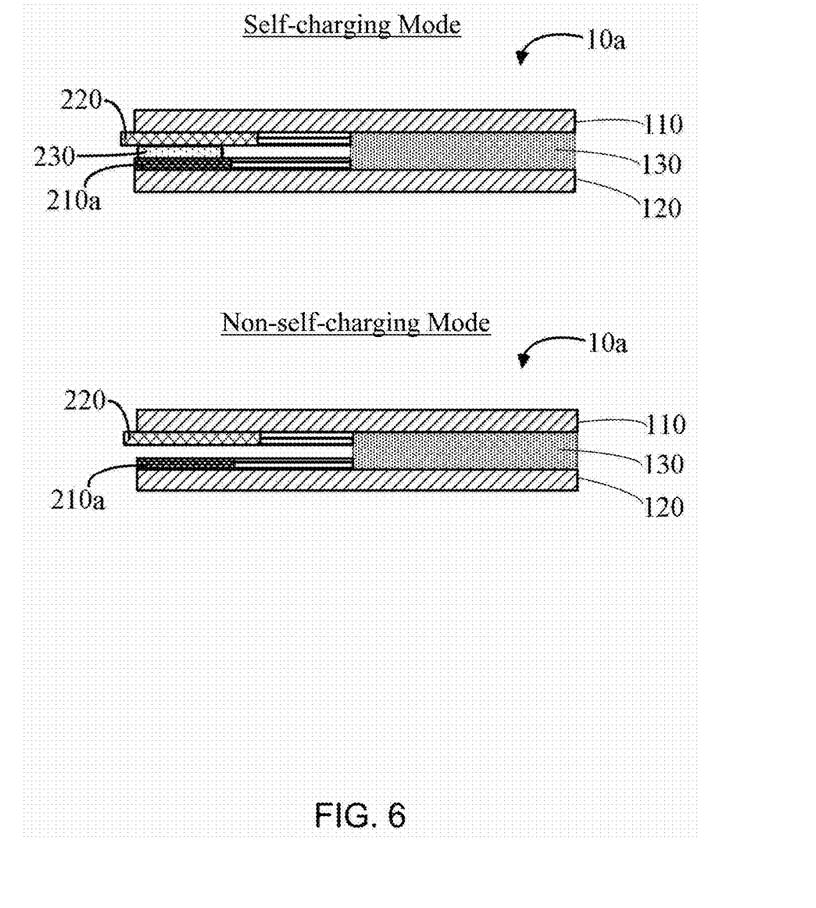
FIG. 6 is a schematic view of the self-charging supercapacitor in FIG. 1 being in self-charging mode and non-self-charging mode, respectively.

Referring to FIG. 6, in self-charging mode, the metal electrode 210a and the supercapacitor first electrode 110 are electrically conducted by the second electrolyte 230, the metal-air cell unit 200 outputs power to charge the supercapacitor unit 100, in non-self-charging mode, the metal electrode 210a and the supercapacitor first electrode 110 are not electrically conducted, the metal-air cell unit 200 does not output power.

The self-charging supercapacitor 10a can switch between the self-charging mode and the non-self-charging mode by controlling the second electrolyte 230. The second electrolyte 230 can be applied between the metal electrode 210a and the supercapacitor first electrode 110 by touching or pressing. The second electrolyte 230 can be sweat or NaCl solution and can be applied by a finger or a swab. For example, touch or press the metal-air cell unit 200 with a sweaty finger or a swab soaked with the NaCl solution, so that the metal electrode 210a and the supercapacitor first electrode 110 are conducted through sweat or NaCl solution.

The gap between the metal electrode 210a and the supercapacitor first electrode 110 can be in a range from about 0 µm to about 100 µm, so that the metal electrode 210a and the supercapacitor first electrode 110 can be easily conducted by the second electrolyte 230.

The gap between the metal electrode 210a and the supercapacitor first electrode 110 can be reduced by pressing the metal-air cell unit 200. In one embodiment, the metal-air cell unit 200 is pressed by a finger or a swab. The pressure can be applied to the outer surface of the third portion 113, the outer surface of the sixth portion 123, or the separator 220.

Furthermore, the separator 220 can extend beyond the edge of the supercapacitor first electrode 110 as shown in FIG. 1 and FIG. 2. A swab soaked with the NaCl solution can directly contact the separator 220 to make the NaCl solution quickly fill the gap. The second electrolyte 220 fills into the gap via the separator 220.

Figure 7:
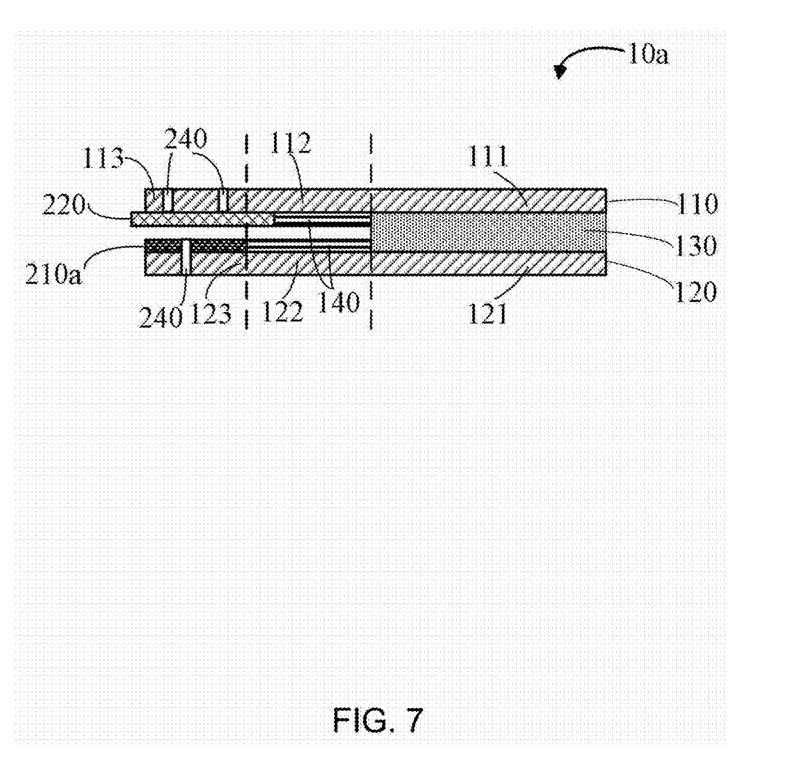
FIG. 7 is a structural schematic view of one embodiment of a self-charging supercapacitor with through holes.

Referring to FIG. 7, in one embodiment, the third portion 113, sixth portion 123, and/or the metal electrode 210a can have through holes 240. The second electrolyte 230 can flow into the gap between the metal electrode 210a and the supercapacitor first electrode 110 through the through hole 240.

The self-charging supercapacitor 10a can be used as a power source of wearable electronic products. In that case, the self-charging supercapacitor 10a can be located close to the skin surface, the sweat generated by human body gradually flows into the gap between the metal electrode 210a and the supercapacitor first electrode 110, so that the metal electrode 210a and the supercapacitor first electrode 110 are conducted.

Figure 8:
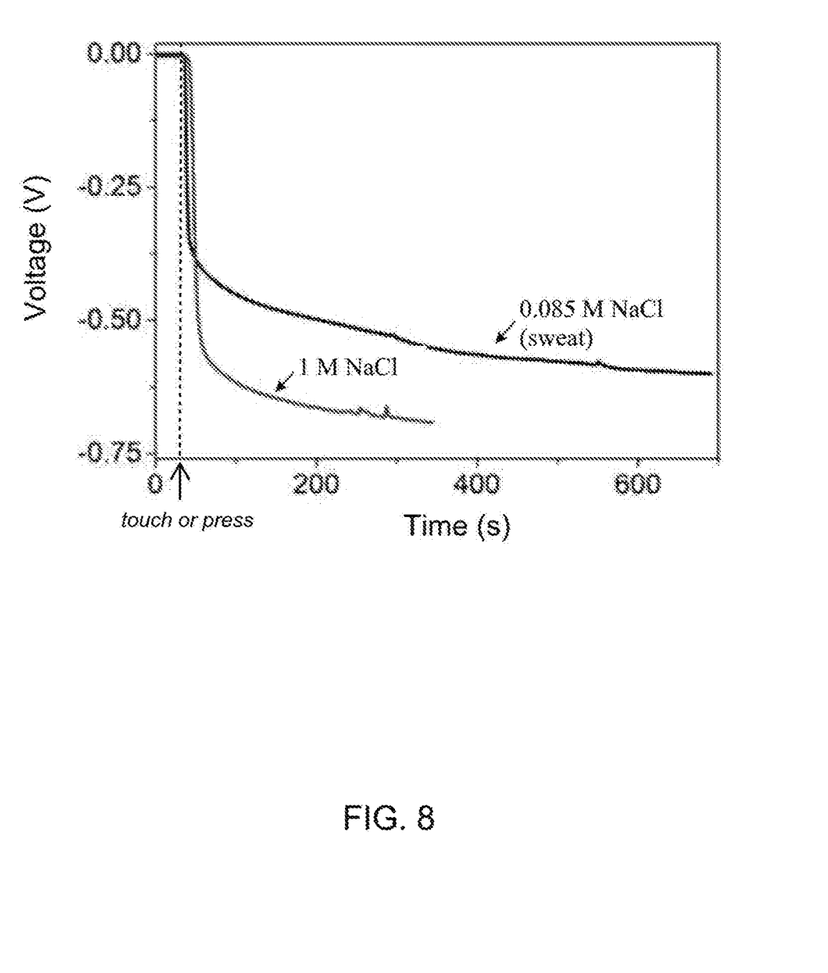
FIG. 8 is an output voltage-time curve of the self-charging supercapacitor in FIG. 1.

Retelling to FIG. 8, in Curve 1, after pressing the separator 220 using a wet swab soaked with a 1M NaCl solution, the self-charging supercapacitor 10a is quickly charged to −0.50 V within 14 seconds, and further charged to −0.69V at the 290th second. The energy stored in the self-charging supercapacitor 10a is 25.6 mJ/cm$^2$ filled 71.4% of its energy density. In Curve 2, after pressing the separator 220 using a wet swab soaked with a 0.085M NaCl solution (similar to human sweat), the self-charging supercapacitor 10a is charged to −0.60 V at the 556th second.

Figure 9:
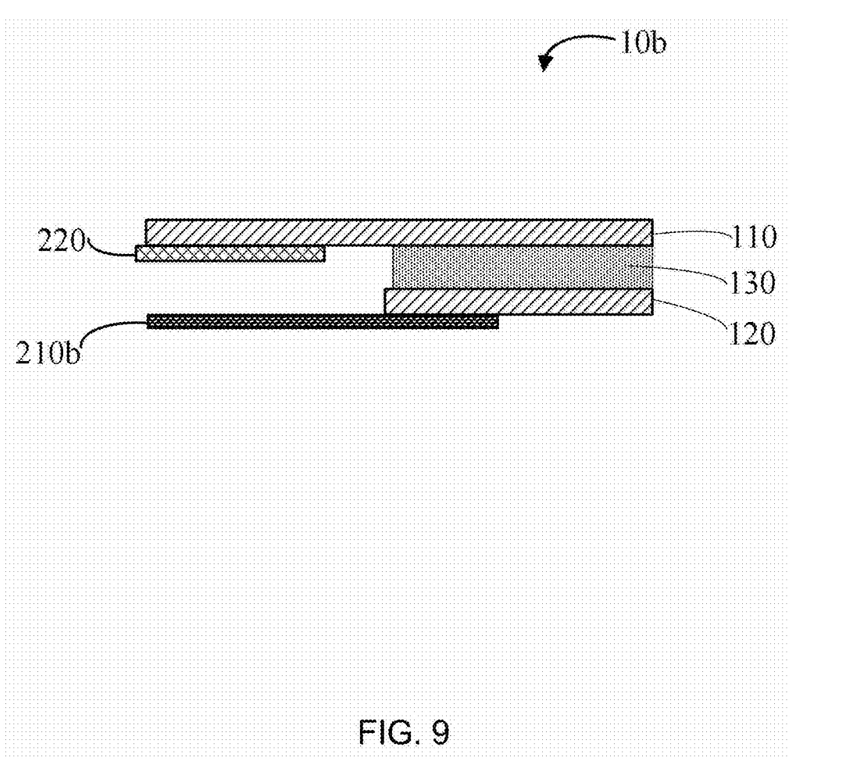
FIG. 9 is a structural schematic view of one embodiment of a self-charging supercapacitor.

FIG. 9 shows an embodiment of a self-charging supercapacitor 10b. The self-charging supercapacitor 10b includes a supercapacitor first electrode 110, a supercapacitor second electrode 120, a first electrolyte 130, and a metal electrode 210b.

The self-charging supercapacitor 10b in the embodiment shown in FIG. 9 is similar to the self-charging supercapacitor 10a in the embodiment shown in FIG. 1, except the connection relationship of the metal electrode 210b and the supercapacitor second electrode 120.

In one embodiment, a part of the metal electrode 210b is Ohmic contacted with a surface of the supercapacitor second electrode 120, and another part of the metal electrode 210b is disposed opposite to the supercapacitor first electrode 110 as a negative electrode of a metal-air cell.

The metal electrode 210b can bend under external force. The material of the metal electrode 210b can be magnesium, aluminum, zinc, iron, or the like. In one embodiment, the metal electrode 210b is an aluminum foil with a thickness of 50 µm.

Figure 10:
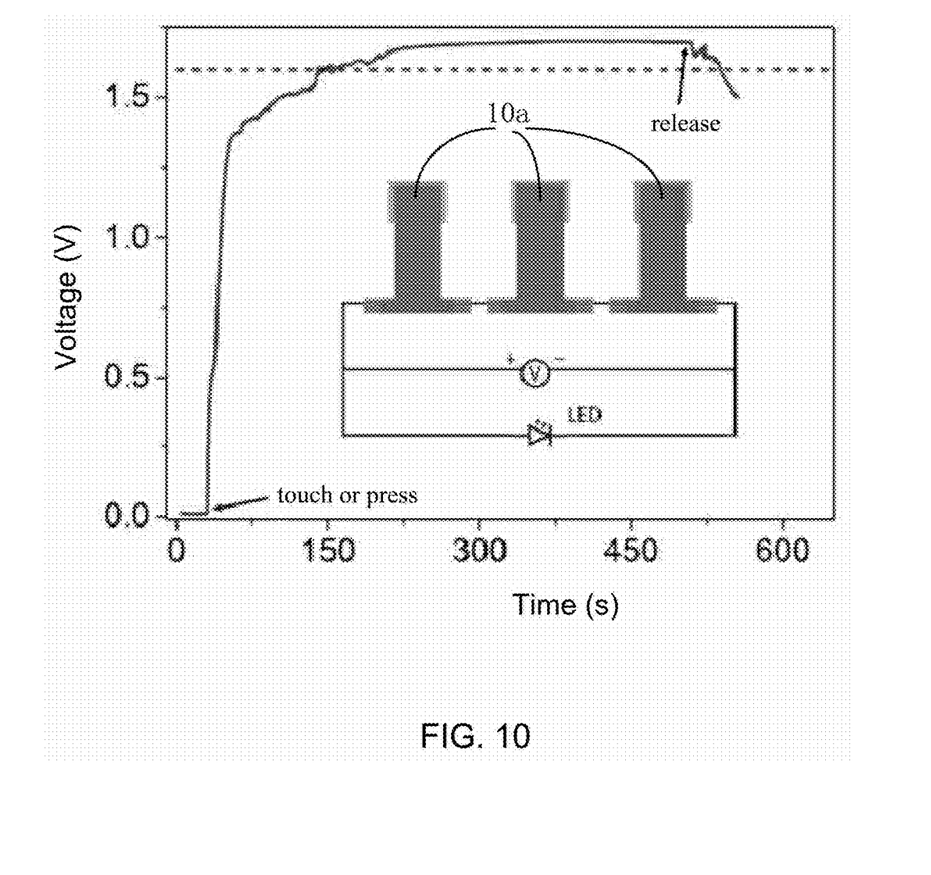
FIG. 10 is schematic view of one embodiment of a plurality of self-charging supercapacitors connected in series.

A plurality of self-charging supercapacitors 10a, 10b can be assembled in series or in parallel. Referring to FIG. 10, three self-charging supercapacitors 10a connected in series can reach an output voltage more than 1.7 V, which is enough to drive a light emitting diode (LED).

The embodiments shown and described above are only examples. Even though numerous characteristics and advantages of the present technology have been set forth in the forego description, together with details of the structure and function of the present disclosure, the disclosure is illustrative only and changes may be made in the detail, including in matters of shape, size and arrangement of the parts within the principles of the present disclosure up to, and including, the full extent established by the broad general meaning of the terms used in the claims.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A self-charging supercapacitor, comprising: a supercapacitor first electrode, a supercapacitor second electrode, a first electrolyte, and a metal electrode; wherein:
   the supercapacitor first electrode and the supercapacitor second electrode are parallel to and spaced apart from each other, the supercapacitor first electrode, the supercapacitor second electrode, and the first electrolyte together form a supercapacitor;
   a part of the metal electrode is Ohmic contacted with a surface of the supercapacitor second electrode, and another part of the metal electrode is disposed opposite to the supercapacitor first electrode; the metal electrode is configured as a negative electrode of a metal-air cell, and the supercapacitor first electrode is configured as a positive electrode of the metal-air cell.

2. The self-charging supercapacitor of claim 1, wherein a gap is defined between the metal electrode, and the supercapacitor first electrode and configured to accommodate a second electrolyte.

3. The self-charging supercapacitor of claim 2, wherein a width of the gap is m a range from about 0 µm to about 100 µm.

4. The self-charging supercapacitor of claim 2, wherein the second electrolyte is configured to electrically conduct the metal electrode and the supercapacitor first electrode.

5. The self-charging supercapacitor of claim 2, wherein the metal electrode and the supercapacitor first electrode are electrically connected via the second electrolyte.

6. The self-charging supercapacitor of claim 2, wherein the second electrolyte is sweat.

7. The self-charging supercapacitor of claim 1, wherein a conductive adhesive is located between the metal electrode and the supercapacitor second electrode.

8. The self-charging supercapacitor of claim 7, wherein the conductive adhesive is silver paste.

9. The self-charging supercapacitor of claim 1, further comprising a separator sandwiched between the metal electrode and the supercapacitor first electrode.

10. The self-charging supercapacitor of claim 1, wherein the first electrolyte is spaced apart from the metal electrode.

11. The self-charging supercapacitor of claim 1, wherein a material of the metal electrode is selected from the group consisting of magnesium, aluminum, zinc, and iron.

12. The self-charging supercapacitor of claim 1, wherein a thickness of the metal electrode is in a range from about 25 μm to about 100 μm.

13. The self-charging supercapacitor of claim 1, wherein the supercapacitor first electrode is a carbon nanotube/polyaniline composite film.

14. The self-charging supercapacitor of claim 13, wherein the carbon nanotube/polyaniline composite film comprises a carbon nanotube network structure and a polyaniline layer.

15. The self-charging supercapacitor of claim 14, wherein the carbon nanotube network structure is a free-standing film network and comprises a plurality of carbon nanotubes combined by van der Waals attractive force therebetween.

16. The self-charging supercapacitor of claim 15, wherein the carbon nanotube network structure comprises a plurality of micropores defined by the plurality of carbon nanotubes.

* * * * *